United States Patent [19]

Taylor

[11] Patent Number: 4,575,977
[45] Date of Patent: Mar. 18, 1986

[54] HOUSING DEVELOPMENT BUILDING ARRANGEMENT

[76] Inventor: Lawrence H. Taylor, P.O. Box 49-58, 48th Street Sta., Union City, N.J. 07087

[21] Appl. No.: 725,758

[22] Filed: Apr. 22, 1985

Related U.S. Application Data

[63] Continuation-in-part of Ser. No. 644,455, Aug. 27, 1984.

[51] Int. Cl.⁴ .............................................. E04B 1/00
[52] U.S. Cl. .................................... 52/169.3; 126/417
[58] Field of Search ........................... 52/169.2, 169.3; 126/417

[56] References Cited

U.S. PATENT DOCUMENTS

| | | | |
|---|---|---|---|
| 3,417,526 | 12/1968 | Lawson | 52/169.3 |
| 3,874,137 | 4/1975 | Gentry | 52/169.3 |
| 3,996,709 | 12/1976 | Coxe | 52/169.3 |
| 4,325,205 | 4/1982 | Salim et al. | 126/417 X |

Primary Examiner—Carl D. Friedman
Attorney, Agent, or Firm—Kerkam, Stowell, Kondracki & Clarke

[57] ABSTRACT

A housing land and fencing arrangement wherein the streets are oriented in an east-west direction such that each house has a north and south boundary to facilitate solar collector orientation.

4 Claims, 3 Drawing Figures

HOUSING DEVELOPMENT BUILDING ARRANGEMENT

This is a continuation-in-part of my application entitle Solar Energy Converting System, Ser. No. 644,455 filed Aug. 27, 1984.

BACKGROUND OF INVENTION

1. Field of the Invention

The present invention relates to building arrangements for achieving maximum utilization of solar energy structures and to an arrangement wherein single family dwellings are provided with maximum economic and practical utilization of lot space, privacy, freedom from invasion of sound and sight of adjacent neighbors and at the same time providing housing structures which are aesthetically pleasing.

2. Description of the Prior Art

Building arrangements are well known in the art which provide one or more of the above recited advantages however none combine all of the recited advantages into a single building arrangement. Exemplary of the prior art are Mehran U.S. Pat. No. 3,732,649 for Building Arrangement, Gentry U.S. Pat. No. 3,874,137 for Building Arrangement, and Sproul U.S. Pat. No. 3,427,645 for Housing Development Layout.

SUMMARY OF THE INVENTION

In accordance with the present invention there is a housing arrangement for at least two adjacent streets having particular utility with houses having solar energy collecting panels positioned on a south facing wall and roof. Each of the at least two adjacent streets are directed in a generally east and west direction and each of the at least two streets services a plurality of adjacent lots. Each of the adjacent lots have north and south directed side boundaries and are adapted to receive a single north facing house with the rear thereof supporting south facing solar collecting panels. A wooded screen of substantial depth extends basically east and west along the north side of each of the at least two adjacent streets and off-street parking extends along the opposite or southerly side of the at least two adjacent streets facing the front of each of the plurality of houses.

BRIEF DESCRIPTION OF THE DRAWINGS

The invention will be more particularly described in reference to the accompanying drawings wherein.

DESCRIPTION OF THE PREFERRED EMBODIMENT

Figure 1:
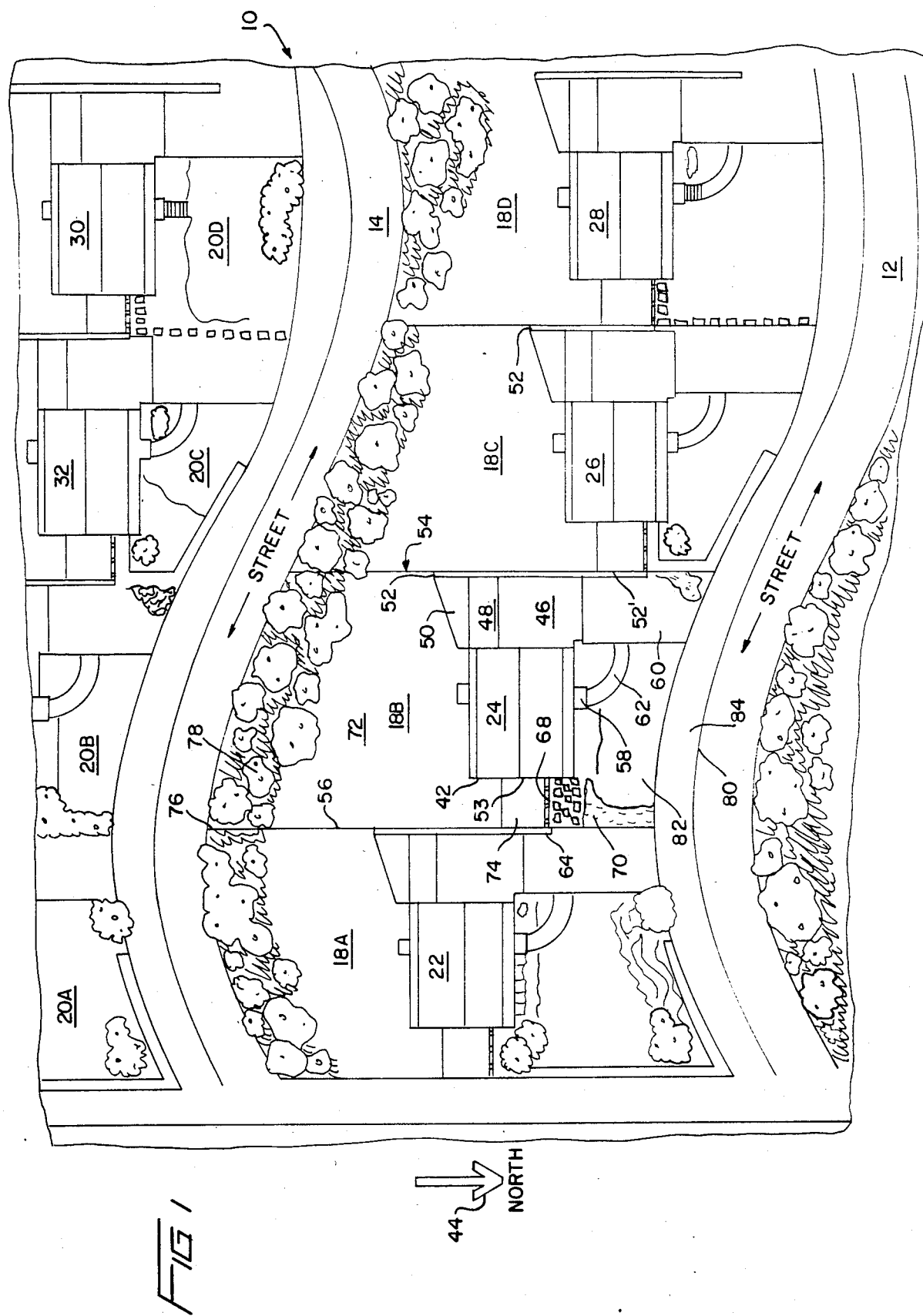
FIG. 1 is a plan view of the building arrangement of a preferred form of the present invention.

Referring to FIG. 1 of the drawing 12 and 14 are streets in a subdivision 10. These streets 12 and 14 run generally east and west, even though these streets are curved for their aesthetic effect and to reduce speed of vehicular traffic through the subdivision.

Between streets 12 and 14 are a plurality of lots generally designated 18A, B, C, and D. Between street 14 and the next rearward street not shown there are also a plurality of lots designated 20A, B, C, and D. Each of the lots accomodates a single family dwelling 22, 24, 26, 28, 30, 32, etc. Each of the houses are similar in design and configuration and for the purposes of this application house 24 shown in detail in FIGS. 2 and 3 will be described. The house 24 is provided with roof and sidewall solar collecting panels 38 and 40 along a back wall 42 which, as indicated by the directional arrow 44, is a south facing wall. Along the right side of the house 24 looking from the front rearwardly is a carport 46, storage facilities and cooking pantry 48, and a screened and roofed porch 50. The sidewall of the porch storage area and carport designated 52 is on the property line 54 between lots 18B and 18C and the wall 52 has a forward extension 52' as a wind and privacy shield. The opposite wall 53 of the house 24 is spaced from the property line 56 between lots 18A and 18B.

The house 24 is provided with a front entrance 58 a driveway 60 and a walkway 62 communicating between the entrance 58 and the driveway 60.

Between sidewall 53 and the wall 64 of the housing structure 22 is a substantial privacy fence acting as a windbreak 68, and preferrable green shrubbery 70 so that basically, access to the backyard 72 may only be gained through the carport with doors 46 or through the house 24. A private patio space 74 is provided rearwardly of the fence 68. Between the edge 76 of street 14 and a portion of the back yard 72 is maintained a densely planted greenery barrier generally designated 78. The function of the greenery barrier is to create a windbreak, saving heat loss in winter and cooling in summer and to block the vision of occupants and guests of house 32 and passing traffic looking toward the back of house 24 and vice versa.

In the front of each of the houses between for example the edge of the street 80 and the grass portion 82 of house 24 is a large off-street parking area 84.

As a further aid in developing a pleasing building plan, houses on the various lots may be staggered front to rear such as illustrated between houses 22, 24 and 26.

Figure 2:
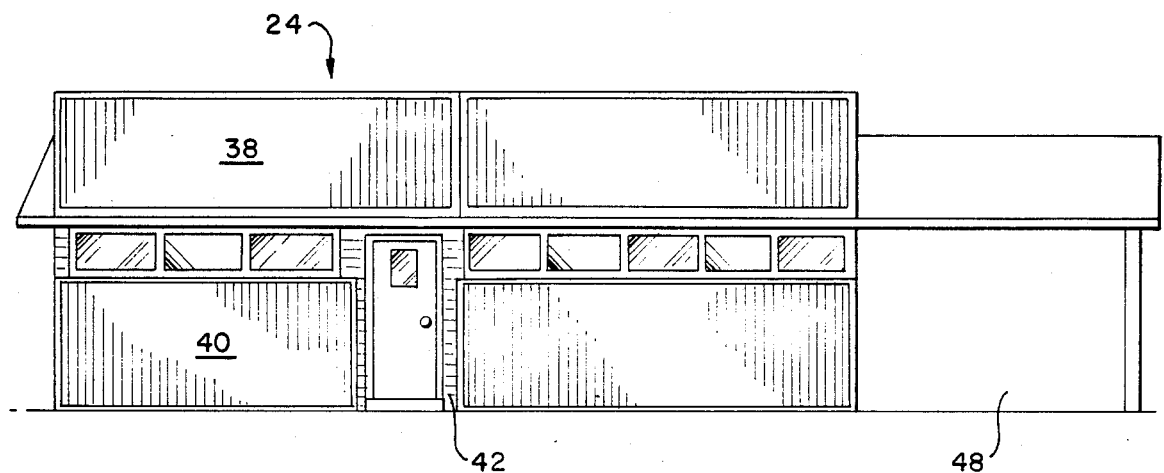
FIG. 2 is a rear elevational view of a building structure particularly suited for the housing development building arrangement of the invention.
Figure 3:
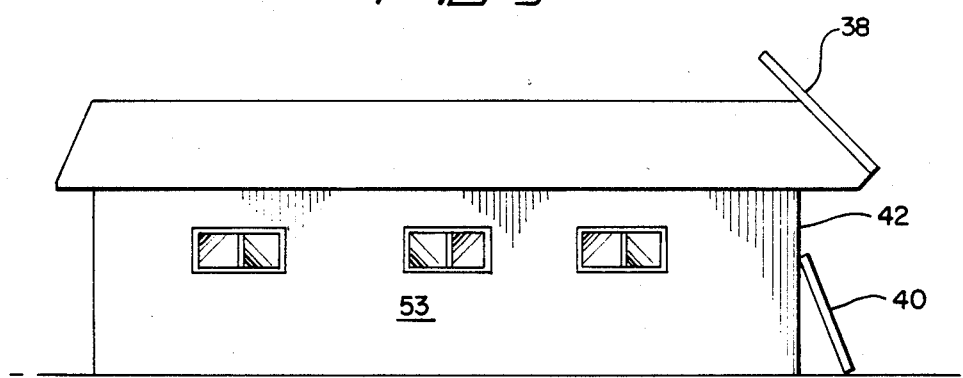
FIG. 3 is a side elevational view of the right side of the structures shown in FIG. 2 looking from the front to the rear.

The present invention is not limited to the form of the dwelling shown in FIGS. 2 and 3 as this arrangement of interacting dwelling, fences, patios and parking areas makes optimum use of the land to conserve energy, provide high security and privacy at minimum cost and yet give maximum convenience.

This plan for land and building utilization has a further advantage in that it permits an economy in utility distribution equivalent to house plot layouts that have houses on both sides of the street because this design permits one row of houses to receive street fed utility service from the back and the next row to be serviced from the front there permitting a developer to run the utility service down every other street which allows costs to be held down to the conventional budget allowed for developments with houses on both sides of each street. Further the invention is not limited to particular lot sizes and the like.

I claim:

1. A housing land and fencing arrangement for at least two adjacent streets having particular utility for houses having solar energy collecting panels positioned on the south facing part of the house; each of the at least two adjacent streets being directed in a generally east and west direction and serving a plurality of adjacent lots; each of said lots having north and south directed side boundaries into walls of said boundaries adjacent to the buildings and adapted to receive a single north facing house with the rear thereof supporting south facing solar collecting panels; a wooded screen acting as a wind, privacy and security barrier of substantial depth parallel to the southern property line along the north side of each of the at least two adjacent streets.

2. The invention defined in claim 1 further including off-street parking extending along the opposite side of the at least two adjacent streets facing the front of each of the plurality of houses.

3. The invention defined in claim 2 wherein one wall of each of the houses is positioned on a north/south lot boundary and the other end wall of said house being spaced from the opposite north/south lot boundary.

4. The invention defined in claim 3 wherein the boundary of the house on the north/south lot boundary includes wall means extending beyond the boundaries of the house to provide wind and privacy barrier.

* * * * *